US008853885B2

(12) United States Patent
Umminger et al.

(10) Patent No.: US 8,853,885 B2
(45) Date of Patent: Oct. 7, 2014

(54) METHOD AND SYSTEM FOR VOLTAGE INDEPENDENT POWER SUPPLY LOAD SHARING (75) Inventors: Christopher Bruce Umminger, Mountain View, CA (US); David Henry Soo, Los Altos, CA (US); Mitchell Edward Lee, San Jose, CA (US); Pinkesh Sachdev, Santa Clara, CA (US); Zhipeng Li, Cambridge, CA (US)

(73) Assignee: Linear Technology Corporation, Milpitas, CA (US)

( * ) Notice: Subject to any disclaimer, the term of this patent is extended or adjusted under 35 U.S.C. 154(b) by 297 days.

(21) Appl. No.: 12/645,341

(22) Filed: Dec. 22, 2009

(65) Prior Publication Data

US 2010/0164289 A1    Jul. 1, 2010

Related U.S. Application Data (60) Provisional application No. 61/141,766, filed on Dec. 31, 2008.

(51) Int. Cl.
*G05F 1/00* (2006.01)
*H02J 1/10* (2006.01)
*G05F 1/565* (2006.01)
*G05F 1/56* (2006.01)
*G05F 1/10* (2006.01)
*G05F 1/575* (2006.01)

(52) U.S. Cl.
CPC . *H02J 1/10* (2013.01); *G05F 1/565* (2013.01); *G05F 1/56* (2013.01); *G05F 1/10* (2013.01); *G05F 1/575* (2013.01)
USPC ............... 307/53; 307/57; 307/82; 307/112; 307/116; 307/130

(58) Field of Classification Search
CPC ............ G05F 1/10; G05F 1/56; G05F 1/565; G05F 1/575
USPC ................. 307/53, 57, 82, 112, 116, 130
See application file for complete search history.

(56) References Cited

U.S. PATENT DOCUMENTS 3,517,325 A    6/1970    Blackmer
4,618,779 A  * 10/1986   Wiscombe ..................... 307/60
(Continued)

OTHER PUBLICATIONS

International Search Report and Written Opinion of the International Searching Authority issued in International Patent Application No. PCT/US2009/069917, mailed Mar. 15, 2010.

(Continued)

*Primary Examiner* — Adi Amrany
(74) *Attorney, Agent, or Firm* — McDermott Will & Emery LLP (57) ABSTRACT An apparatus and method for load sharing among N current supplies, where N>1. N current supply paths are coupled to corresponding N independent power sources, respectively. A system load is coupled to the outputs of the N current supply paths to receive N current supplies. There is a common current share bus configured to connect to the N current supply paths to provide a common current share signal, used to indicate the current contribution needed from each of the N current supply paths. In this configuration, each of the N current supply paths adjusts an adjustable voltage drop between its power source and the current supply it provides to the system load in accordance with the common current share signal so that the current supplied from each current supply path is consistent with the common current share signal.

45 Claims, 8 Drawing Sheets

(56) References Cited

U.S. PATENT DOCUMENTS

| | | | |
|---|---|---|---|
| 5,191,302 A | 3/1993 | Rossnick | |
| 5,428,523 A * | 6/1995 | McDonnal | 363/71 |
| 5,428,524 A * | 6/1995 | Massie | 363/79 |
| 5,552,643 A * | 9/1996 | Morgan et al. | 307/81 |
| 5,598,041 A * | 1/1997 | Willis | 307/43 |
| 5,796,274 A | 8/1998 | Willis et al. | |
| 5,808,453 A * | 9/1998 | Lee et al. | 323/224 |
| 6,144,115 A * | 11/2000 | Massie et al. | 307/80 |
| 6,177,783 B1 | 1/2001 | Donohue | |
| 6,459,171 B1 * | 10/2002 | Leifer | 307/52 |
| 6,608,402 B2 | 8/2003 | Soo et al. | |
| 6,664,657 B2 | 12/2003 | Hailey | |
| 6,665,404 B2 * | 12/2003 | Cohen | 379/413 |
| 6,801,030 B2 * | 10/2004 | Tai et al. | 324/117 R |
| 6,809,678 B2 * | 10/2004 | Vera et al. | 341/166 |
| 6,850,045 B2 * | 2/2005 | Muratov et al. | 323/272 |
| 6,897,717 B1 | 5/2005 | Eddleman et al. | |
| 7,038,924 B2 * | 5/2006 | Wu | 363/89 |
| 7,164,258 B2 | 1/2007 | Umminger | |
| 7,282,899 B1 * | 10/2007 | Daun-Lindberg et al. | 323/272 |
| 7,304,462 B2 * | 12/2007 | Shvarts | 323/284 |
| 7,960,861 B2 * | 6/2011 | Gscheidle et al. | 307/52 |
| 7,965,061 B2 * | 6/2011 | Li et al. | 320/152 |
| 8,008,901 B2 * | 8/2011 | Tang et al. | 323/282 |
| 2003/0132669 A1 * | 7/2003 | Bahl et al. | 307/52 |
| 2003/0222504 A1 * | 12/2003 | Priest | 307/52 |
| 2004/0046535 A1 * | 3/2004 | Duffy et al. | 323/283 |
| 2004/0095021 A1 | 5/2004 | Fogleman et al. | |
| 2007/0281755 A1 * | 12/2007 | Dwelley | 455/572 |
| 2009/0261798 A1 * | 10/2009 | Sachdev et al. | 323/288 |

OTHER PUBLICATIONS

Korean Office Action issued in Application No. 10-2011-7015835 dated May 26, 2013.

* cited by examiner

FIG. 8

METHOD AND SYSTEM FOR VOLTAGE INDEPENDENT POWER SUPPLY LOAD SHARING

RELATED APPLICATION

The present invention claims priority of provisional patent application No. 61/141,766 filed Dec. 31, 2008, the contents of which are incorporated herein in their entirety.

BACKGROUND

1. Technical Field

The present teaching relates to method and system for analog circuits. More specifically, the present teaching relates to method and system for power supply load sharing and systems incorporating the same.

2. Discussion of Technical Background

Connecting the output of two or more power supplies together allows them to share a common load current. Load sharing has various advantages. Load sharing puts less thermal stress on each individual power supply's components, thus increasing the overall power system's reliability and lifetime. It allows smaller power supplies to be used in parallel to supply a larger load. In systems with time-varying load currents supplied by dynamically-managed parallel supplies, load sharing enables each supply to be operated at its peak power-conversion efficiency point. High-availability electronic systems usually employ an N+n configuration of power supplies, where N is the number of supplies that are required to supply the load current and n is the number of extra or redundant supplies. Load sharing is often an essential feature of such systems.

The division, or sharing, of the load current between the supplies depends on their individual output voltages and the connection resistance to the common load. This is called droop sharing. To prevent reverse current into a supply, which is called back-feeding, a diode can be added in series with each supply output. In this case, the diode voltage drop also influences the current sharing between supplies.

An active method of load sharing is implemented in a load sharing controller from Linear Technology Corporation. In this load sharing controller, the current from each power supply is monitored by sensing the voltage drop across a series current sense resistor. The load sharing controller compares this current sense signal against a share bus signal. The share bus signal indicates the load current needed per supply to maintain regulation of the load voltage. The load sharing controller then adjusts the output voltage of the supply via the supply's feedback network or trim input to match its current to the share bus, thus achieving load sharing.

Texas Instruments offers device UCC39002, designed to achieve load sharing by adjusting the power supply voltage. The share bus signal indicates the highest of all the supply currents. National Semiconductor Corporation provides a device that uses a share bus that is the average of all the supply currents.

Those traditional approaches to load sharing have some disadvantages. Although droop sharing is simple, sharing accuracy can be hard to control. While the back-feeding problem is solved with one or more diodes connected in series, the diode itself wastes power. Although the load sharing controller from Linear Technology Corp. and other existing controller devices solve these problems, designs based on such conventional technologies can be complicated because one has to accommodate the power supply loop dynamics into the load sharing loop dynamics, with each supply requiring custom loop stability compensation. Additionally, these controllers can only manipulate supplies with a trim/adjust pin or an accessible feedback network. This may not be readily available, or there may be noise injection concerns about routing this signal on a circuit board. Furthermore, the need to route the share bus signal to all the supplies also introduces a potential single point of failure.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching relates to load sharing control schemes and implementations thereof to enable two or more power supplies to share a single load current. The load sharing control scheme as described herein is voltage independent in the sense that the common mode of the supply voltages does not affect load sharing. In addition, the load sharing control scheme, as disclosed herein, does not require a trim/adjust pin on the power supply. The load sharing control scheme of the present teaching does not need to be physically close to the power supply and the power supply loop dynamics do not need to be figured into the design, allowing it to work with a wide variety of input supplies. The load sharing method and system as disclosed herein also blocks reverse currents to prevent potential damage caused by back-feeding. All of these features achieved by the present teaching lead to a simpler and faster design of a load sharing power supply system.

Figure 1:
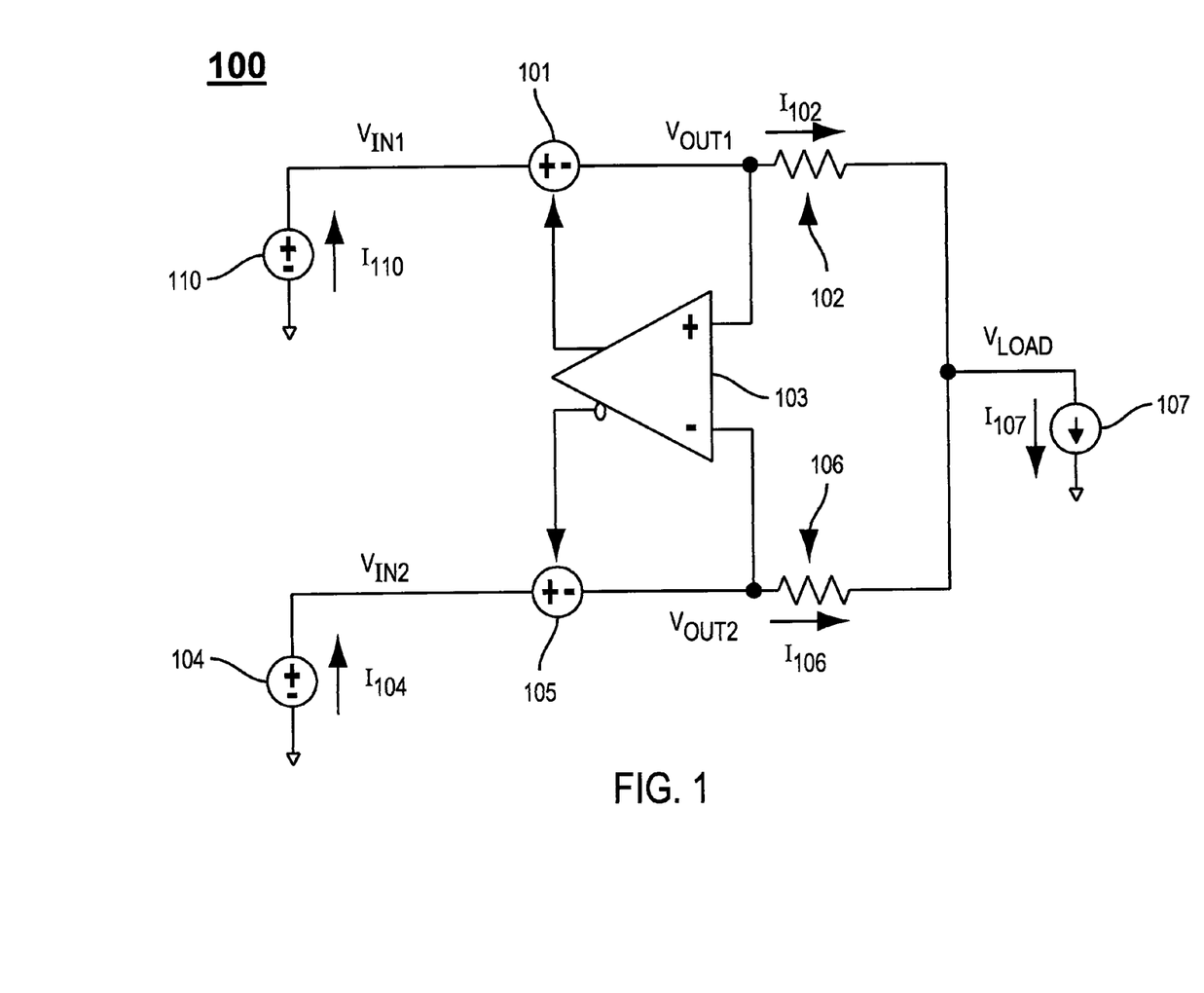
FIG. 1 depicts an exemplary circuit to control load sharing in accordance with an embodiment of the present teaching.

FIG. 1 depicts an exemplary circuit 100 designed to control load sharing, in accordance with an embodiment of the present teaching. For illustration purposes, the circuit 100 is used to show the concept of the present teaching based on a two supply system. As will be seen later (FIG. 8) and understood by a person skilled in the art, the present teaching is not limited to a two supply system and can be applied for load sharing in an N-supply system.

In FIG. 1, circuit 100 includes power supplies, 110 and 104, that are connected in parallel to supply load 107. As shown, power supply 110 provides $V_{IN1}$, which goes through a path which comprises an adjustable voltage drop 101 that produces an intermediate voltage level $V_{OUT1}$, and a current sense resistor 102. Similarly, power supply 104 provides $V_{IN2}$, which goes through another parallel path which comprises an adjustable voltage drop 105 that produces an intermediate voltage level $V_{OUT2}$, and a current sense resistor 106. It is noted that a voltage drop as described herein can be either a positive or a negative value. Both the adjustable voltage drops (101 and 105) and current sense resistors (102 and 106) are inserted in the parallel power supply paths between each supply and the common load 107 with voltage $V_{LOAD}$. The voltage drop of each of the adjustable voltage drops 101 and 105 can be dynamically controlled. The current sense resistors 102 and 106 can either be explicit sense resistors or the resistance inherent in the circuit board traces.

Along each of the power supply paths, the original voltage provided from its power source may differ. This may subsequently cause the intermediate voltages to vary, i.e., $V_{OUT1}$ does not equal $V_{OUT2}$. This will further lead to unequal currents through the current sense resistors 102 and 106 and, hence, the unequal supply of current from each power supply path to the common load. To dynamically produce an equal contribution of current to the common load from each power supply path, the sensed difference between $V_{OUT1}$ and $V_{OUT2}$ is fed to a current balancing control element. In some embodiments, such a current balancing control element can be implemented based on an error amplifier device shown in FIG. 1 (103), which is deployed to adjust the voltage drop on 101 and/or 105 based on the sensed difference in current through the current sense resistors.

The error amplifier device 103 controls the series voltage drops 101 and 105 to force $V_{OUT1}$ to equal $V_{OUT2}$. For example, when the output voltage of supply 110 rises, it temporarily causes an increase of $V_{OUT1}$ above $V_{OUT2}$. When the error amplifier device 103 receives input (via the current variation sensed by the current sense resistors 102 and 106) indicating such, as a corrective measure, the error amplifier device 103 raises the voltage drop of 101 to equalize $V_{OUT1}$ and $V_{OUT2}$. In some embodiments, the adjustment of voltage drop can be performed in both paths, i.e., it raises the voltage drop of 101 while lowering the voltage drop of 105 to again equalize $V_{OUT1}$ and $V_{OUT2}$. By making the adjustment on the voltage drops to ensure that $V_{OUT1}=V_{OUT2}$ in different power supply paths, the current from supply 110 is the same as the current in current sense resistor 102, which is ($V_{OUT1}-V_{LOAD}$)/$R_{102}$. Similarly, the current from supply 104 is the same, i.e., ($V_{OUT2}-V_{LOAD}$)/$R_{106}$, assuming $R_{102}=R_{106}$. In this way, the two supply currents turn out to be equal. Since currents from both power supply paths add up to the load current $I_{107}$, each of the paths provides half of the load current i.e., $I_{110}=I_{104}=I_{107}/2$. In this manner, the two supplies share the load current equally. In some applications, a ratiometric current sharing may be needed. In those situations, the resistances of the two current sense resistors 102 and 106 can be appropriately set in accordance with a ratio so that $I_{110}/I_{104}=R_{106}/R_{102}$.

Figure 2:
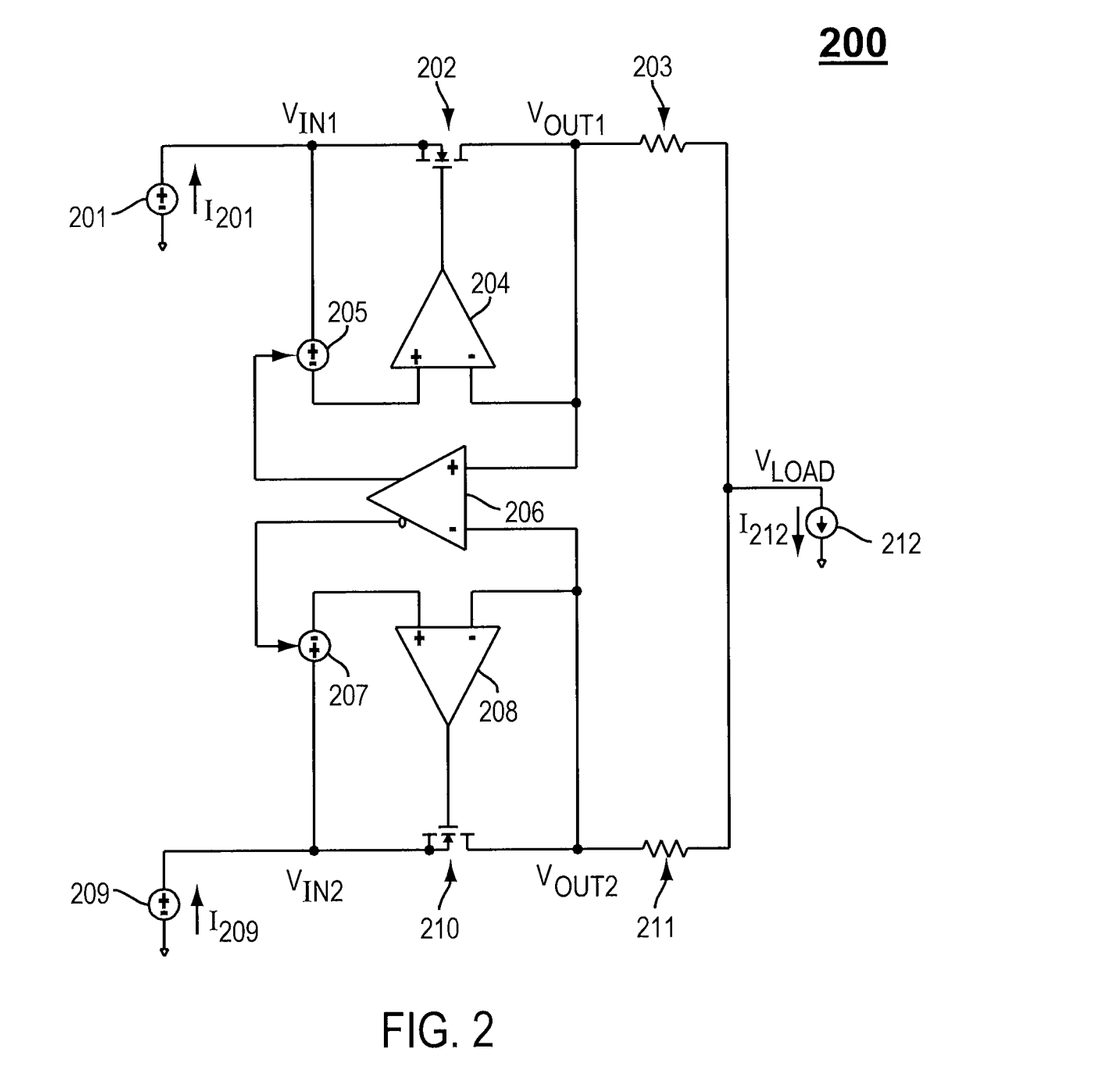
FIG. 2 depicts a more detailed circuit implemented to control load sharing in accordance with an embodiment of the present teaching.

In operation, reverse current may occur in a power supply path. For example, reverse currents may flow when a power supply is at a lower potential than the common load bus. It is commonly known that a large reverse current can damage the power supply. In addition, reverse currents waste power. Hence, it is often necessary to block reverse currents. FIG. 2 depicts a more detailed circuit 200 implemented to control load sharing in accordance with an embodiment of the present teaching. The circuit 200 as illustrated is capable of preventing reverse current and protecting the power supply from any damage caused by reverse current.

Circuit 200 is constructed similarly to circuit 100 except that the voltage drop is implemented in a certain way, according to some embodiment of the present teaching. Specifically, circuit 200 comprises two power supply paths, each of which has a power supply source (201 and 209), an adjustable voltage drop, and a current sense resistor (203 and 211). The currents from both power supply paths flow to a common load 212. Each of the adjustable voltage drops is implemented based on an N-channel MOSFET (202 and 210), a command voltage source (205 and 207), and a servo amplifier (204 and 208). In operation, the error amplifier device 206 equalizes $V_{OUT1}$ and $V_{OUT2}$ by controlling the voltage sources 205 and 207. In the top power supply path, the N-channel MOSFET 202, the command voltage source 205, and the servo amplifier 204 achieve the function of an adjustable voltage drop in the following manner. The servo amplifier 204 controls the gate voltage of the N-channel MOSFET 202 based on the intermediate voltage $V_{OUT1}$ and the command voltage source 205 (which is controlled by the error amplifier device 206). Specifically, the servo amplifier 204 is used to keep the forward voltage drop (the source to drain voltage) across the N-channel MOSFET equal to the voltage source 205. The other power supply path is similarly controlled via servo amplifier 208, N-channel MOSFET 210, and voltage source 207, which is controlled by the error amplifier device 206.

Figure 5A:
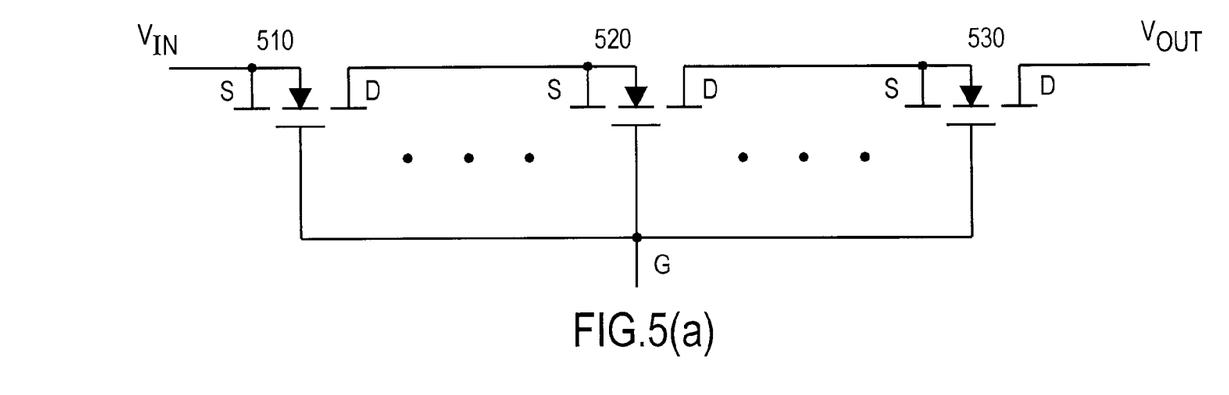
FIGS. 5(a) and 5(b) show alternative implementations of a controllable series voltage drop using power MOSFETs, in accordance with embodiments of the present teaching.
Figure 5B:
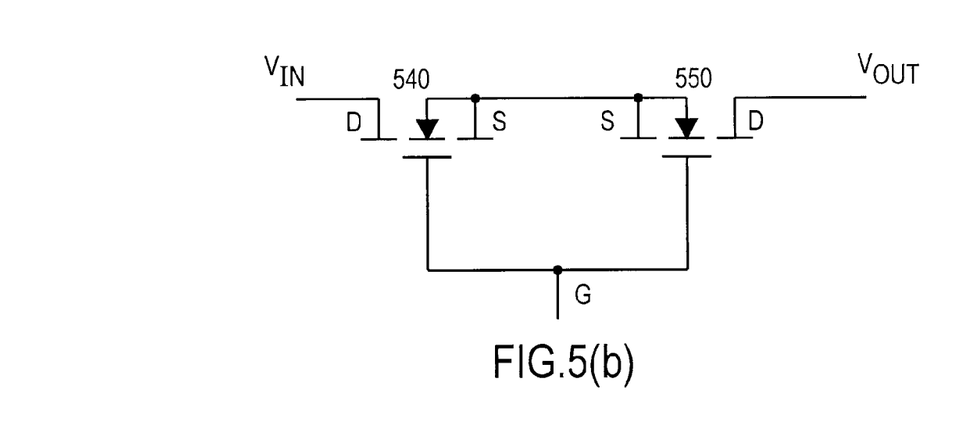

There are some practical considerations in terms of limiting the range of the MOSFET voltage drop. To prevent reverse currents flowing through the MOSFET, the voltage drop should not be allowed to go below zero. In general, it is preferred to limit the voltage drop to a small positive value ($V_{F(MIN)}$), such as 30 mV. The maximum voltage drop ($V_{F(MAX)}$) across a single MOSFET may also be limited, e.g., to a diode drop by an intrinsic body diode between the source and drain of the MOSFET. To allow a larger voltage drop, a series of MOSFETs may be employed in place of a single MOSFET. This is shown in FIG. 5(a), where two or more MOSFET (510, 520, and 530, as illustrated) can be connected in series to replace each single MOSFET 202 and 210. Alternatively, two MOSFETs can also be connected back to back, as shown in FIG. 5(b) (540 and 550) to achieve the same. Although the back to back connection in FIG. 5(b) is shown to be source to source connection, drain to drain connection is also feasible to achieve the same functionality (not shown).

Figure 3A:
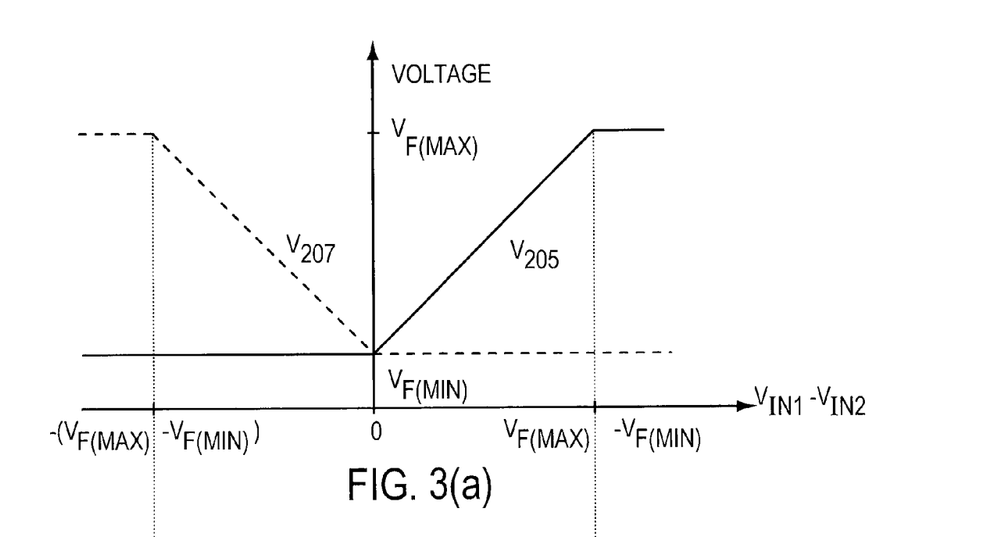
FIG. 3(a) shows plots of voltage levels of different command voltage sources in controlling load sharing, in accordance with an embodiment of the present teaching.
Figure 3B:
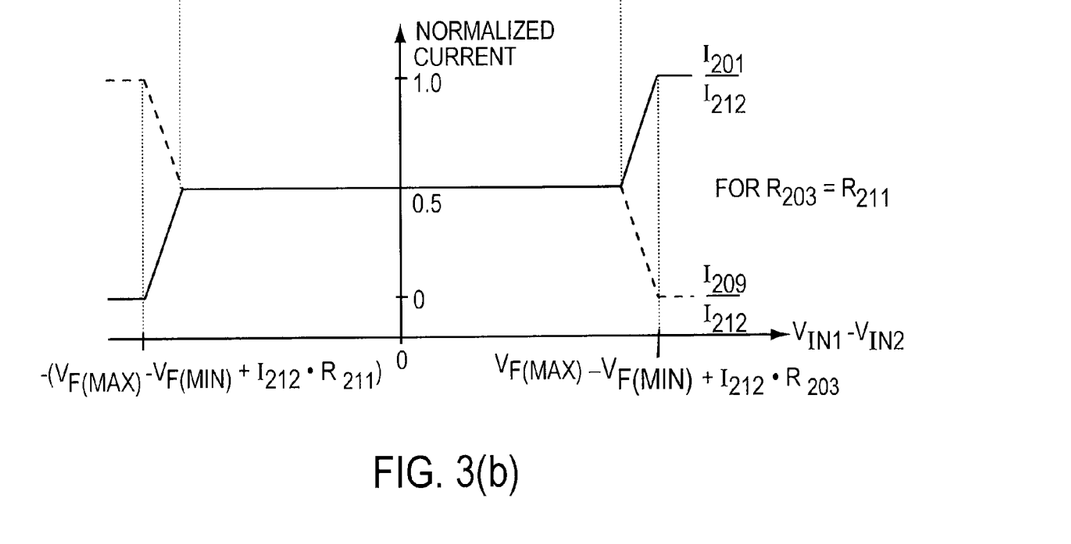
FIG. 3(b) show plots of the supply currents normalized to the load current, in accordance with an embodiment of the present teaching.

The maximum voltage drop is also limited by the MOSFET's power handling capacity, i.e., $V_{F(MAX)} \leq P_{D(MAX)}/I_{212}$, where $V_{F(MAX)}$ is the maximum forward voltage drop, $I_{212}$ is the load current in FIG. 2, and $P_{D(MAX)}$ is the maximum safe power dissipation in the MOSFET. FIG. 3(a) illustrates how voltage sources 205 and 207 vary between these two limits with the difference between the two input supply voltages due to the action of amplifier 206. When the two input supply voltages are equal ($V_{IN1}-V_{IN2}2=0$) both MOSFETs have the minimum voltage drop, $V_{F(MIN)}$. When $V_{IN1}$ rises above $V_{IN2}$, the drop across MOSFET 202 is increased, by amplifier 206, to match the rise in $V_{IN1}$. The drop across MOSFET 210 is maintained at $V_{F(MIN)}$. Thus, $V_{OUT1}$ remains equal to $V_{OUT2}$. Therefore, the two supply currents are equal if $R_{203}$ equals $R_{211}$. The forward drop across MOSFET 202 reaches $V_{F(MAX)}$ when the difference between the two supply inputs is $V_{F(MAX)}-V_{F(MIN)}$. If $V_{IN1}$ continues to rise above $V_{IN2}$, $V_{OUT1}$ also rises above $V_{OUT2}$. Because of this, the current of supply 201 increases and that of supply 209 decreases. As the input difference increases further, a point is reached wherein the entire load current transfers to the higher supply. This is shown in FIG. 3(b). The current sharing behavior is symmetric when $V_{IN2}$ increases above $V_{IN1}$.

In some embodiments, the load sharing scheme as described herein can be further enhanced by reducing the forward drop of the MOSFET back to minimum once the two supply voltages are separated enough that only one is supplying the entire load current. In this situation, there is no further need to maintain the maximum drop across the MOSFET especially because it wastes power. In some embodiments, this can be achieved by detecting when the MOSFET in the lower supply path has switched off. The gate signal of this MOSFET can be used to switch the drop of the conducting MOSFET back to $V_{F(MIN)}$.

In some situations, however, such a quick or sharp lowering of the drop may cause the load voltage to jump up which may be undesirable. An alternative approach, in some embodiments is to adopt a softer method which can use a low-gain difference amplifier (not shown) between $V_{IN1}$ and $V_{IN2}$ to reduce the drop gently back to $V_{F(MIN)}$ after the difference has exceeded $V_{F(MAX)}-V_{F(MIN)}$. In some embodiments, another alternative approach is to reduce the forward drop so that the power dissipated in the MOSFET will not exceed $V_{F(MAX)} \cdot I_{212}/2$.

Figure 4:
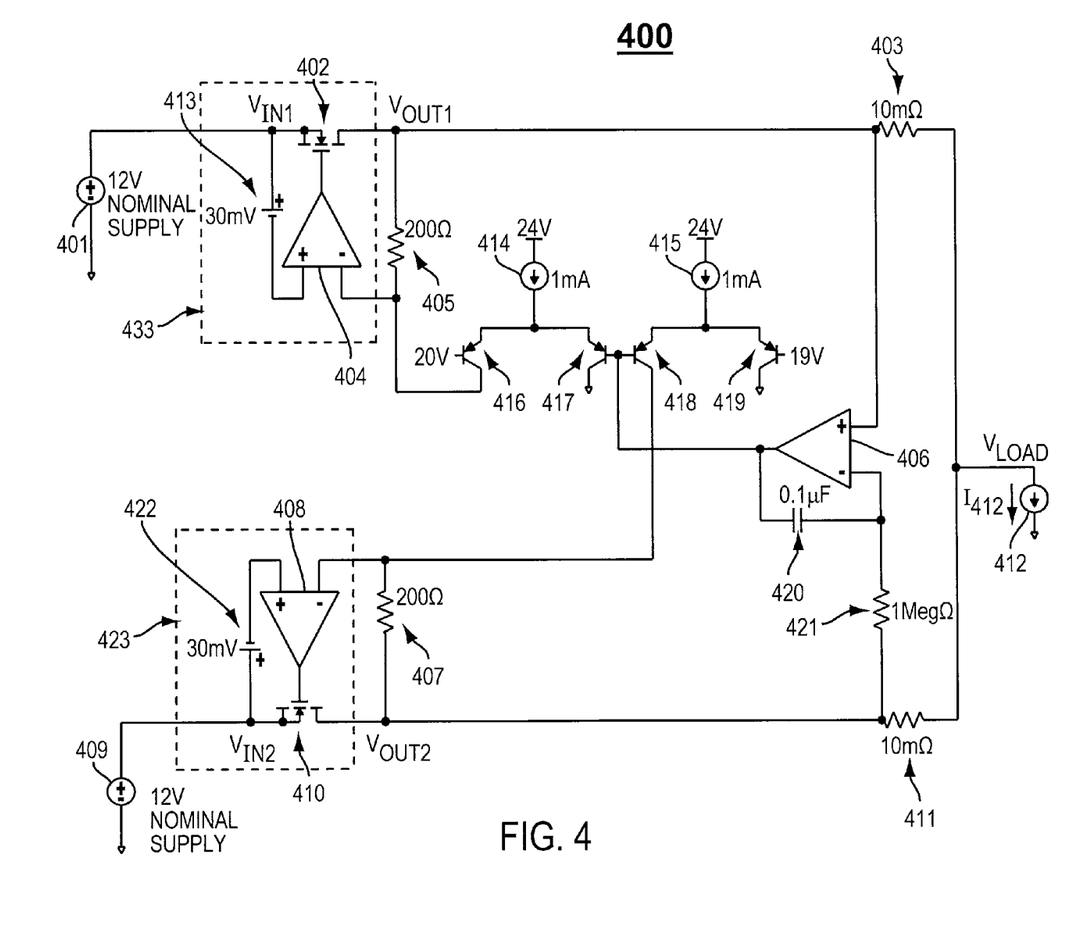
FIG. 4 provides an exemplary implementation of a circuit for controlling load sharing, in accordance with an embodiment of the present teaching.

FIG. 4 provides an exemplary implementation of a circuit 400 for controlling load sharing, in accordance with an embodiment of the present teaching. The MOSFET forward drop along both power supply paths is designed based on the servo amplifier function, as described herein, and is implemented using devices 433 and 423. Device 433 comprises a servo amplifier 404, which has a built-in 30 mV reference 413, and an N-channel MOSFET 402. Device 423 comprises the same, a servo amplifier 408 which has a built-in 30 mV reference 422, and an N-channel MOSFET 410. As discussed herein, the N-channel MOSFET can be replaced with a series of MOSFETs for an improved forward drop range, as shown in FIGS. 5(a) and 5(b). In addition, the built-in 30 mV is merely illustrative and this built-in value may change with the needs of applications. This built-in value can be dynamically changed to a forward drop command, which is then used by the servo amplifier to adjust the MOSFET forward drop to equalize the current in each path.

In both power supply paths, the forward drop command can be increased above 30 mV by passing a current through a resistor 405 or 407 (both are illustrated to have a value of 200Ω). The increase can be made up to a maximum of 1 mA, which provides a $V_{F(MAX)}$ of 230 mV (1 mA·200Ω+30 mV). Here, the exemplary $V_{F(MIN)}$ is 30 mV. The error amplifier 406 may correspond to a device, which integrates the error amplifier 406 with a capacitor 420 and a resistor 421. The output of the error amplifier 406 controls the current flowing through resistors 405 and 407, which sets up the forward drop commands in combination with 413 and 422, which are then used by the two servo amplifiers 404 and 408 to control the forward voltage drops on the MOSFETs 402 and 410.

Circuit 400 also comprises four PNP transistors, 416, 417, 418, and 419, and the two reference voltages, 19V and 20V. These additional components in circuit 400 are deployed to make certain that when one forward drop command is being raised the other one stays at the minimum 30 mV as shown in FIG. 3(a). In operation, when $V_{OUT1}$ rises above $V_{OUT2}$, the output of error amplifier 406 rises accordingly in voltage. This drives up the base of two PNP devices, 417 and 418. When the output of amplifier 406 reaches 20V, current from source 414 is diverted from PNP 417 towards PNP 416. Such a current flows through resistor 405 raising the forward drop command voltage to servo amplifier 404. The amplifier 404 then pulls down the gate of MOSFET 402 to increase its on resistance. This brings down $V_{OUT1}$ and the loop eventually makes it equal $V_{OUT2}$. When the base of PNP 418 reaches about 20V, all the current from source 415 flows through PNP 419 and, hence, no longer flows through 418. Thus the command voltage for servo amplifier 408 stays at the minimum 30 mV.

In some embodiments, circuitry can be added to implement a fast turn-on and fast turn-off of the MOSFETs 402 and 410. Such circuitry may comprise a forward and a reverse comparator that monitor the drop across the MOSFET. If the forward drop (the source to drain voltage) exceeds a threshold, then the forward comparator would trip triggering a fast turn on of the MOSFET. This limits the load voltage droop. The reverse comparator monitors the reverse voltage (drain to source voltage), and when the reverse voltage exceeds a threshold, the reverse comparator then quickly turns off the MOSFET. This limits the amount of reverse current that can flow into the power supply.

In the above illustrative embodiments (circuit 200 and 400 and what is shown in FIGS. 5(a) and 5(b)), specific implementations are provided. For example, MOSFETs are used to implement the adjustable voltage drop and current sense resistors are used for sensing the current. As a person skilled in the art would understand, those functionalities may be realized using other implementations. For instance, a series voltage drop may also be implemented based on other devices such as JFETs. In addition, to infer the current contribution of a supply, other methods such as a current sense amplifier, hall effect sensor, flux gate, transformer, or current monitor output from the supply may be used. Furthermore, the functionality achieved by PNP devices 416-419, as shown in FIG. 4, can also be implemented using other devices such as P-channel MOSFETs.

Figure 6:
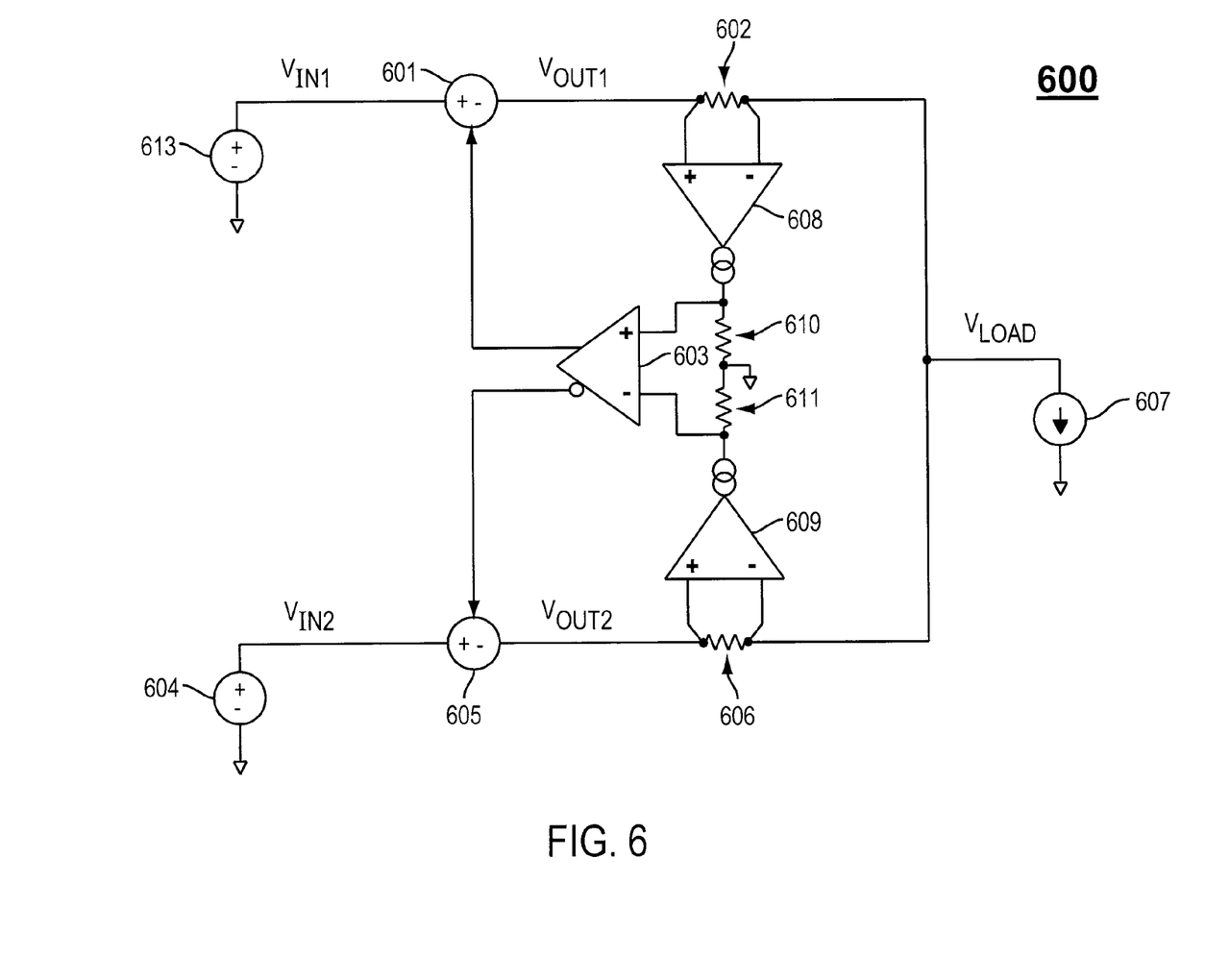
FIG. 6 depicts another exemplary circuit to control load sharing in accordance with an embodiment of the present teaching.

FIG. 6 depicts another exemplary circuit 600 as an alternative implementation of circuit 100 to control load sharing in accordance with an embodiment of the present teaching. In this illustrated embodiment, all elements are similarly configured as what is shown in FIG. 1 except the current sensing parts of the circuit. In FIG. 1, current sense resistor 102 and 106 are employed to sense the current flowing from $V_{OUT1}$ and $V_{OUT2}$ to $V_{LOAD}$, respectively. In FIG. 6, for sensing the current flowing from $V_{OUT1}$ to $V_{LOAD}$, current sensing amplifier 608 and resistor 610 are employed with current sense resistor 602 in the top power supply path. Similarly, for sensing the current flowing from $V_{OUT2}$ to $V_{LOAD}$, current sensing amplifier 609 and resistor 611 are employed with current sense resistor 606 in the bottom power supply path. In this circuit 600, an amplifier (608 or 609) can translate a high common-mode differential current-sense signal from a current sense resistor to a single-ended ground referenced signal. The voltage-drop adjusting error amplifier 603 can take these ground referenced signals from the two supply paths as its inputs. With this sensing scheme, the circuit 600 is immune to parasitic trace resistance between sense resistors 602 and 606 and the load 607. It is noted that a current sensing element as described herein can be located anywhere along a current supply path.

Figure 7:
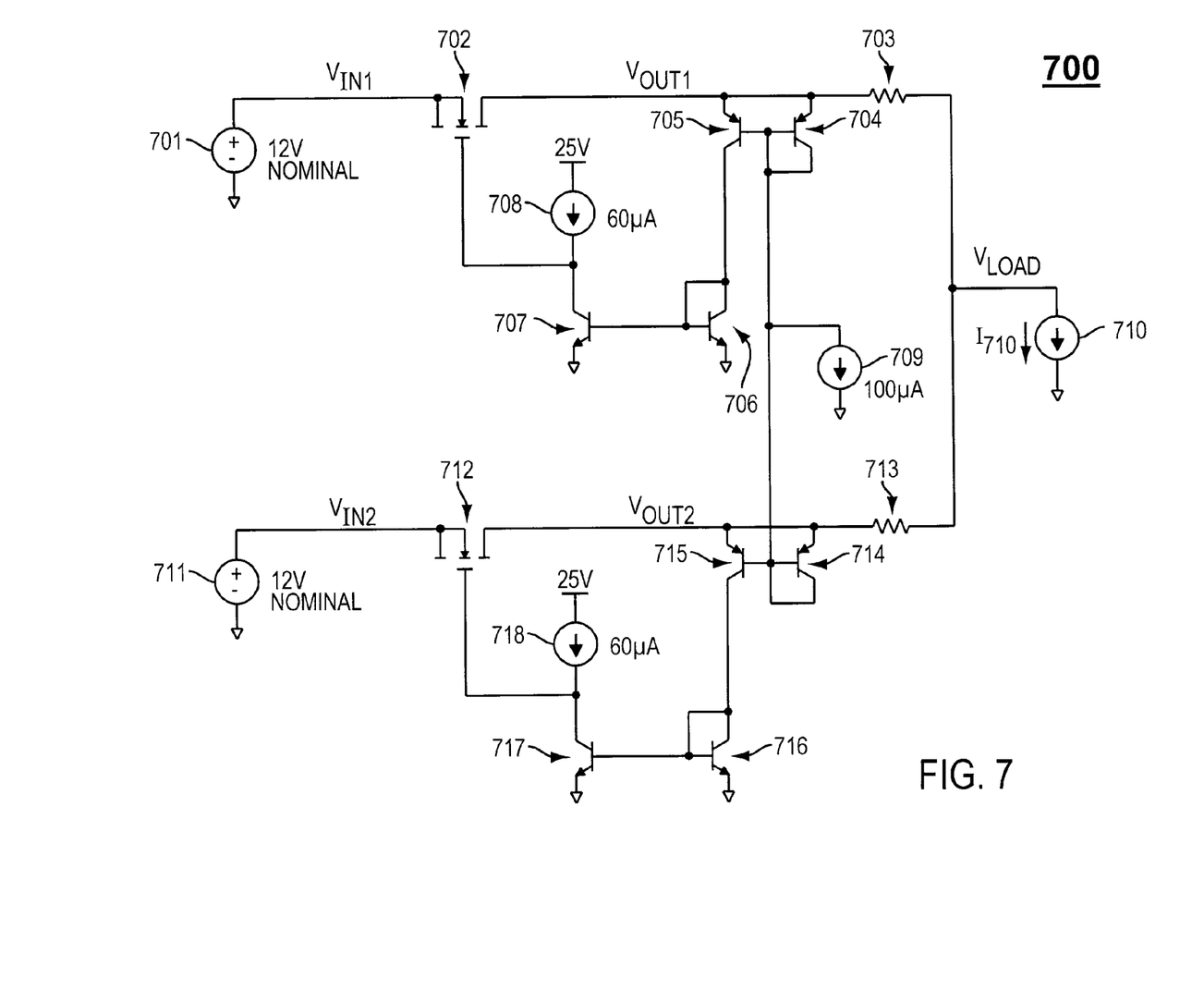
FIG. 7 depicts yet another exemplary circuit to control load sharing in accordance with an embodiment of the present teaching.

FIG. 7 depicts yet another alternative implementation of circuit 100 to control load sharing in accordance with an embodiment of the present teaching. In operation, when the top supply voltage 701 ($V_{IN1}$) is higher than that of 711 ($V_{IN2}$), $V_{OUT1}$ becomes higher temporarily as compared with $V_{OUT2}$. This leads to a situation where the current flowing through the current sense resistor 703 is higher than that flowing through the current sense resistor 713. This further causes PNP device 704 to take a greater share of the 100 uA current source 709 than PNP device 714. Such additional current is then mirrored in PNP device 705 and in NPN device 707. This additional current thus pulls down on the gate of the N-channel MOSFET 702, lowering its gate voltage and making it more resistive. As a consequence, this brings $V_{OUT1}$ back down to make it closer to $V_{OUT2}$ and thus restores balanced current sharing.

In this illustrated scheme, when the MOSFET's resistance on a higher supply path is being adjusted, the other MOSFET (on the lower supply path) is turned completely on to a low resistance state. One potential issue associated with this implementation is that reverse current may occur and back-feeding of the lower supply may happen when the two supplies diverge. To solve this problem, exemplary solutions to block reverse current such as what is shown in FIG. 4, may be employed in conjunction with the circuit as shown in FIG. 7.

Figure 8:
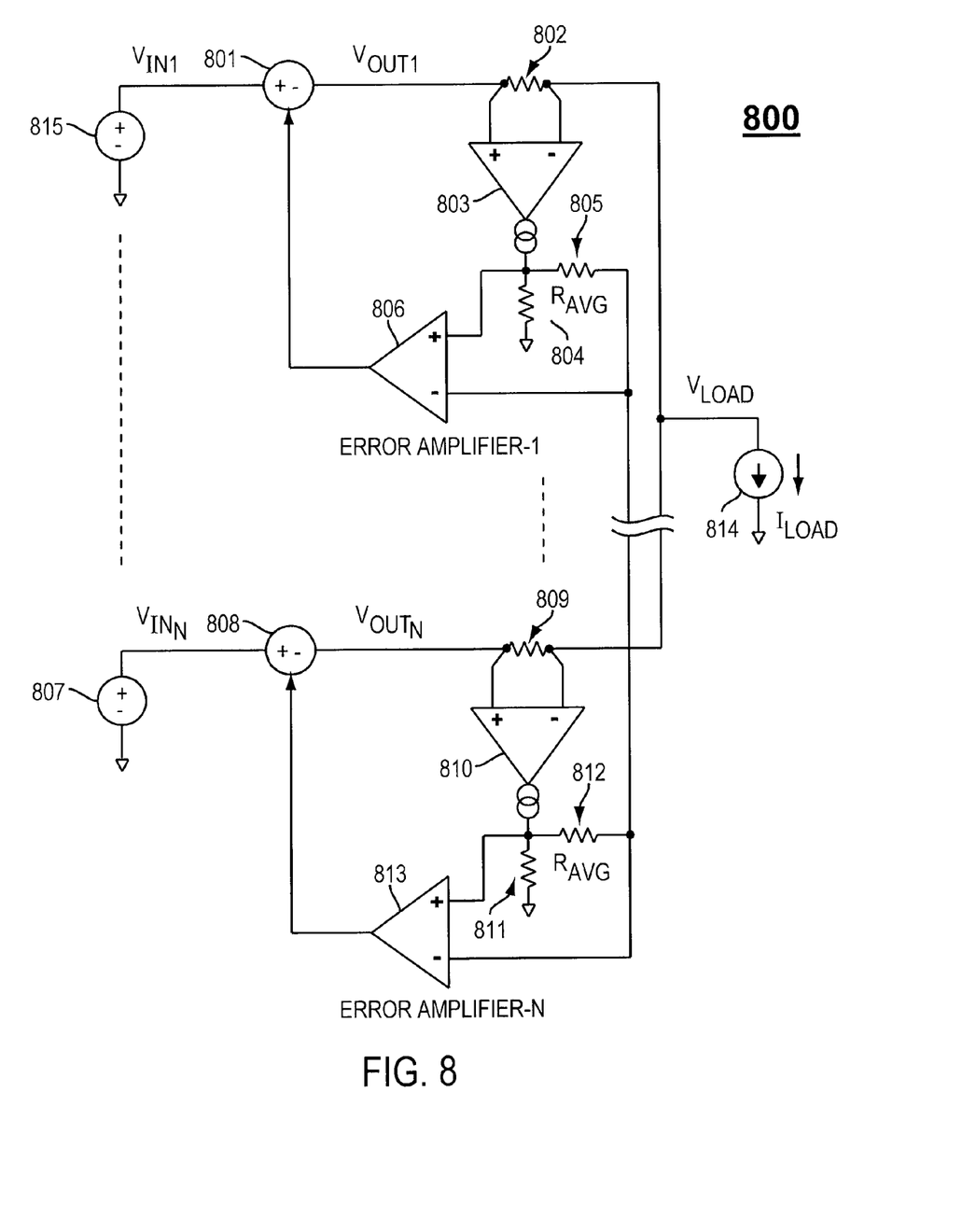
FIG. 8 depicts an exemplary circuit for N-supply load sharing, in accordance with an embodiment of the present teaching.

Although what is disclosed so far involves a two power supply system, as discussed herein, the present teaching can be extended to an N-supply system. FIG. 8 depicts an exemplary circuit for N-supply load sharing, in accordance with an embodiment of the present teaching. In this embodiment, there are N supplies 800, . . . , 807 providing $V_{IN1}, \ldots, V_{INN}$ to a common load 814 with voltage $V_{LOAD}$. There are N power supply paths, each of which comprises a current sensing sub-circuit, an error amplifier, and an adjustable voltage drop. For example, in the first supply path, the current sensing sub-circuit comprises a sensing element around a current sensing resistor 802, where the current sensing element includes an amplifier 803 that takes inputs from two sides of the current sensing resistor 802 and converts the two signals into one, as disclosed herein. The current sensing sub-circuit also includes two resistors 804 and 805. The single signal converted by the amplifier 803 is sent, as an input, to the error amplifier-1 806, which adjusts the voltage drop across element 801. The other input of the error amplifier-1 806 is a specified level of current expected to be contributed from the first supply path. Circuit for each of the other supply paths can be similarly constructed, as shown in FIG. 8.

With this implementation of an N-supply system, a common current share signal is needed to indicate the current contribution needed from each supply. As shown in FIG. 8, every supply path includes an error amplifier (806, . . . , 813) that has this common current share signal as input and compares with the signal from the current sensing circuit. Based on the difference between the two input signals, the error amplifier in each supply path tries to make its supply current equal to the common current share signal by adjusting the MOSFET forward drop. There are different methods to determine the common current share signal and different circuits to implement these methods. For example, the common current share signal can be generated by an average of all the supply currents. It may also be generated by dividing the common load current or $I_{LOAD}$ by N. The common current share signal may also be determined as the highest of all the supply currents. A voltage share bus may also be added to minimize the common mode of all the voltage drops.

If there is a need to utilize an error signal to indicate a break in load sharing, it can be easily achieved via different approaches. In some embodiments, it can be achieved by monitoring the output of each of the error amplifiers in each individual supply path. Such monitoring can be dynamically performed on-the-fly based on the behavior of the error amplifiers. In a two-supply system, when one of the error amplifiers is railed, the load is no longer being shared but is now flowing from only one supply. In an N-supply system, a railed error amplifier implies that a supply from that path is no longer contributing its required share of current.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A system for two-supply load sharing, comprising:
a first current supply path coupled to a first power source providing a first input voltage, the first current supply path including a first adjustable voltage drop element for producing a first intermediate voltage, and a first current sensing element for sensing a first current flowing through the first current supply path, the first intermediate voltage being produced at a first node between the first adjustable voltage drop element and the first current sensing element;
a second current supply path coupled to a second power source providing a second input voltage, the second current supply path including a second adjustable voltage drop element for producing a second intermediate voltage, and a second current sensing element for sensing a second current flowing through the second current supply path, the second intermediate voltage being produced at a second node between the second adjustable voltage drop element and the second current sensing element;
a system load coupled to outputs of both the first and second current supply paths to receive first and second supply currents; and
a current balancing control element including an error amplifier for comparing the first and second intermediate voltages with each other to produce first and second control signals respectively supplied to the first and second adjustable voltage drop elements to control the first and second adjustable voltage drop elements based on a difference between the first and second intermediate voltages so as to balance the first and second intermediate voltages,
wherein the first adjustable voltage drop element comprises:
a first device configured to provide a first adjustable voltage drop;
a first servo amplifier having a first input coupled to a first input of the error amplifier and the system load, and an output coupled to a control terminal of the first device for adjusting the first adjustable voltage drop; and
a first command voltage source taking the first control signal as its input, coupled to the first power source and a second input of the first servo amplifier,
the first command voltage source is controlled by the first control signal from the current balancing control element, and
the servo amplifier is configured to adjust the first adjustable voltage drop in accordance with a value of the first command voltage source.

2. The system of claim 1, wherein
the error amplifier has non-inverting and inverting inputs;
the non-inverting input of the error amplifier is coupled to an inverting input of the first servo amplifier and corresponds to the first intermediate voltage; and
the inverting input of the error amplifier corresponds to the second intermediate voltage.

3. The system of claim 1, wherein the first current sensing element is connected
between the first adjustable voltage drop element and the system load; or
between the first power source and the first adjustable voltage drop element.

4. The system of claim 1, wherein the first device is an N-channel metal-oxide-semiconductor field-effect transistor (MOSFET), having its gate connected to an output of the servo amplifier.

5. The system of claim 1, wherein the first device comprises a plurality of serially connected N-channel MOSFETs, wherein
a first of the plurality of N-channel MOSFETs has its source coupled to the first power source,
a last of the plurality of N-channel MOSFETs has its drain coupled to the first current sensing element, and
all intermediate N-channel MOSFETs have their source connected to drain of a previous N-channel MOSFET and their drain connected to source of a next N-channel MOSFET, respectively, and
gate terminals of the plurality of N-channel MOSFETs are connected to an output of the servo amplifier.

6. The system of claim 1, wherein the first device comprises two back-to-back-connected N-channel MOSFETs, wherein the back-to-back connected N-channel MOSFETs are
source-to-source connected; or
drain-to-drain connected.

7. The system of claim 6, wherein
gates of the first and second back-to-back-connected N-channel MOSFETs are tied together and connected to an output of the servo amplifier.

8. The system of claim 1, wherein the first device includes a junction gate field-effect (JFET) transistor.

9. The system of claim 1, wherein the first command voltage source is a built-in voltage reference which has a minimum voltage reference.

10. The system of claim 9, wherein the second adjustable voltage drop element of the second current supply path is constructed the same way as the first adjustable voltage drop element of the first current supply path.

11. The system of claim 1, wherein the first command voltage source has an upper limit.

12. The system of claim 1, wherein the first command voltage source is reduced to a minimum reference voltage when the second current supply path is no longer providing a current to the system load.

13. The system of claim 12, wherein the first command voltage source is reduced as a function of the difference between voltages from the first and second power sources.

14. The system of claim 1 or 13, wherein the adjustable voltage drop element is capable of preventing a reverse current flow.

15. The system of claim 1, wherein the first current sensing element is a first current sense resistor.

16. The system of claim 1, wherein the first current sensing element comprises:
a first current sense resistor; and
a first amplifier configured to take inputs from two sides of the first current sense resistor and convert the two signals into one signal as its output, which is coupled to a non-inverting input of the error amplifier.

17. The system of claim 16, wherein a non-inverting input of the error amplifier is coupled to the output of the first amplifier and a first resistor connected to ground.

18. The system of claim 1, wherein the second current sensing element is connected
between the second adjustable voltage drop element and the system load; or
between the second power source and the second adjustable voltage drop element.

19. The system of claim 1, wherein the second current sensing element includes a second current sense resistor.

20. The system of claim 1, wherein the second current sensing element comprises:
a second current sense resistor; and
a second amplifier configured to take inputs from two sides of the second current sense resistor and convert the two signals into one signal as its output, which is coupled to an inverting input of the current balancing control element.

21. The system of claim 20, wherein an inverting input of the error amplifier is coupled to the output of the second amplifier and a second resistor connected to ground.

22. The system of claim 1, wherein the current balancing control element comprises:
a sub-circuit taking an output signal from the error amplifier as input and configured to generate the first and second control signals.

23. The system of claim 22, wherein the error amplifier is integrated with a first capacitor and a third resistor, wherein
the first capacitor connects between the output signal of the error amplifier and the inverting input of the error amplifier, and
the third resistor connects between the inverting input of the error amplifier and the current sensing element in the second current supply path.

24. The system of claim 22, wherein the sub-circuit comprises:
a first pair of transistors coupled to the output signal of the error amplifier and configured to generate the first control signal;
a fourth resistor coupled between the first control signal and the first current supply path;
a second pair of transistors coupled to the output signal of the error amplifier and configured to generate the second control signal; and
a fifth resistor coupled between the second control signal and the second current supply path.

25. The system of claim 24, wherein one end of the fourth resistor is coupled to an output of a first adjustable voltage drop element in the first current supply path.

26. The system of claim 24, wherein one end of the fifth resistor is coupled to an output of a second adjustable voltage drop element in the second current supply path.

27. The system of claim 24, wherein the first pair of transistors comprises:
a first PNP transistor having its base connected to a first positive voltage, its collector connected to the first control signal, and its emitter connected to a first pull-up current source;
a second PNP transistor having its base connected to the output of the error amplifier, its collector to the ground, and its emitter to the first pull-up current source.

28. The system of claim 27, wherein the second pair of transistors comprises:
a third PNP transistor having its base connected to a second positive voltage, its collector to the ground, and its emitter to a second pull-up current source;
a fourth PNP transistor having its base connected to the output signal of the error amplifier, its emitter to the second pull-up current source, and its collector to the second control signal.

29. The system of claim 28, wherein the first positive voltage is higher than the second positive voltage.

30. The system of claim 28, wherein the first positive voltage is 20V and the second positive voltage is 19V.

31. The system of claim 24, wherein
the first pair of transistors is a pair of P-channel MOSFETs; and
the second pair of transistors is a pair of P-channel MOSFETs.

32. The system of claim 1, wherein the first and second current supplies are balanced to provide a ratiometric current sharing.

33. The system of claim 1, wherein the current balancing control element is configured to control the first and second adjustable voltage drop elements by controlling a first impedance of the first current supply path and a second impedance of the second current supply path so as to balance the first and second current supplies.

34. A system for two-supply load sharing, comprising:
a first current supply path coupled to a first power source providing a first input voltage, the first current supply path including a first adjustable voltage drop element for producing a first intermediate voltage, and a first current sensing element for sensing a first current flowing through the first current supply path, the first intermediate voltage being produced at a first node between the first adjustable voltage drop element and the first current sensing element;
a second current supply path coupled to a second power source providing a second input voltage; the second current supply path including a second adjustable voltage drop element for producing a second intermediate voltage, and a second current sensing element for sensing a second current flowing through the second current supply path, the second intermediate voltage being produced at a second node between the second adjustable voltage drop element and the second current sensing element;
a system load coupled to outputs of both the first and second current supply paths to receive first and second supply currents; and
a current balancing control element including an error amplifier for comparing the first and second intermediate voltages with each other to produce first and second control signals respectively supplied to the first and second adjustable voltage drop elements to control the first and second adjustable voltage drop elements based on a difference between the first and second intermediate voltages so as to balance the first and second supply currents,
wherein the first adjustable voltage drop element includes:
a first device configured to provide a first adjustable voltage drop,
a first voltage source controlled by the error amplifier to provide a voltage that varies as a function of a difference between the first input voltage and the second input voltage, and
a first voltage drop control circuit responsive to the first intermediate voltage and the voltage provided by the first voltage source for controlling the first device so as to adjust the first adjustable voltage drop.

35. The system of claim 34, wherein the current balancing control element is configured to change a voltage drop in one of the first and second current supply paths to a pre-determined voltage drop level when a disparity between the first and second current supply paths is found to meet a pre-determined criterion.

36. The system of claim 35, wherein the disparity corresponds to a difference between the current supplies from the first and second current supply paths.

37. The system of claim 35, wherein the disparity corresponds to a difference between corresponding input voltages from the first and second power sources.

38. The system of claim 35, wherein the pre-determined voltage drop level corresponds to a minimum forward drop.

39. The system of claim 35, wherein the current balancing control element changes the voltage drop to a pre-determined voltage drop level based on the corresponding one of the first and second control signals.

40. The system of claim 35, wherein the voltage drop to a pre-determined voltage drop level is achieved via a low gain difference amplifier coupled to the voltages of the first and second power sources.

41. The system of claim 35, wherein the voltage drop to a pre-determined voltage drop level is achieved by adjusting the voltage drop so that the power dissipation during the adjustment does not exceed a pre-determined level.

42. The system of claim 35, wherein the current balancing control element is configured to control the first adjustable voltage drops by controlling a first impedance of the first current supply path so as to balance the first and second current supplies.

43. A system for an N-supply load sharing, comprising:
N current supply paths, where N>1, coupled to corresponding N independent power sources providing respective input voltages; the N current supply paths include N adjustable voltage drop elements for producing N current signals,
a system load coupled to outputs of the N current supply paths to receive N supply currents; and
a common current share bus configured to connect to the N current supply paths, and providing a common current share signal, indicating a current contribution needed from each of the N current supply paths, wherein
each of the N current supply paths includes an error amplifier for comparing the respective current signal and the common current share signal with each other to produce a control signal to control the respective voltage drop element so as to make the respective current signal consistent with the common current share signal, and
the respective voltage drop element comprises:
a device configured to provide an adjustable voltage drop;
a servo amplifier having a first input coupled to a first input of the error amplifier and the system load, and an output connected to a control terminal of the device for adjusting the adjustable voltage drop; and
a command voltage source taking the control signal as its input, coupled to a power source and a second input of the servo amplifier,
the command voltage source is controlled by the control signal, and
the servo amplifier is configured to adjust the adjustable voltage drop in accordance with a value of the command voltage source.

44. The system of claim 43, wherein each of the N current supply paths comprises:
- a current sensing element configured to sense a current flowing through the current supply path; wherein
- the error amplifier is configured to generate a control signal, based on the current sensed by the current sensing element in the current supply path and the common current share signal, wherein
- the adjustable voltage drop element includes an impedance element adjustable based on the control signal to ensure that current supplied to the system load is in accordance with the common current share signal.

45. A system for two-supply load sharing, comprising:
- a first current supply path coupled to a first power source providing a first input voltage, the first current supply path including a first adjustable voltage drop element and producing a first current signal;
- a second current supply path coupled to a second power source providing a second input voltage, the second current supply path including a second adjustable voltage drop element and producing a second current signal;
- a system load coupled to outputs of both the first and second current supply paths to receive first and second supply currents; and
- a current balancing control element including an error amplifier for comparing the first and second current signals with each other to produce first and second control signals respectively supplied to the first and second adjustable voltage drop elements to control the first and second adjustable voltage drop elements based on a difference between the first and second supply currents so as to balance the first and second supply currents, wherein the first adjustable voltage drop element includes:
- a first device configured to provide a first adjustable voltage drop,
- a first voltage source controlled by the error amplifier to provide a voltage that varies as a function of a difference between the first input voltage and the second input voltage, and
- a first voltage drop control circuit responsive to the first current signal and the voltage provided by the first voltage source for controlling the first device so as to adjust the first adjustable voltage drop.

* * * * *